United States Patent
Dick et al.

(10) Patent No.: US 11,153,487 B2
(45) Date of Patent: Oct. 19, 2021

(54) METHOD AND APPARATUS FOR ACTIVE REDUCTION OF MECHANICALLY COUPLED VIBRATION IN MICROPHONE SIGNALS

(71) Applicant: GoPro, Inc., San Mateo, CA (US)

(72) Inventors: Timothy Dick, San Francisco, CA (US); Eric Penrod, Brentwood, CA (US); Erich Tisch, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 15 days.

(21) Appl. No.: 16/710,902

(22) Filed: Dec. 11, 2019

(65) Prior Publication Data

US 2021/0185229 A1 Jun. 17, 2021

(51) Int. Cl.
*H04N 5/232* (2006.01)
*H04R 1/34* (2006.01)
*G10L 21/0208* (2013.01)
*H04N 5/225* (2006.01)

(52) U.S. Cl.
CPC ..... *H04N 5/23258* (2013.01); *G10L 21/0208* (2013.01); *H04N 5/2257* (2013.01); *H04N 5/2328* (2013.01); *H04N 5/23254* (2013.01); *H04R 1/342* (2013.01)

(58) Field of Classification Search
None
See application file for complete search history.

(56) References Cited

U.S. PATENT DOCUMENTS

| | | | |
|---|---|---|---|
| 10,433,087 B2* | 10/2019 | Bernal Castillo | H04R 3/04 |
| 10,845,379 B1* | 11/2020 | Bhandari | A63F 13/212 |
| 2014/0133647 A1* | 5/2014 | Michaelis | H04R 3/00 |
| | | | 379/392.01 |
| 2016/0295279 A1* | 10/2016 | Srinivasan | G10L 19/018 |
| 2017/0220786 A1* | 8/2017 | Guo | G06F 21/36 |
| 2018/0075820 A1* | 3/2018 | Hicks | G09G 5/363 |
| 2019/0025114 A1* | 1/2019 | McLaughlin | G01H 1/00 |
| 2019/0334540 A1* | 10/2019 | Kobayashi | G01C 9/06 |

OTHER PUBLICATIONS

BMI270 product flyer, Bosch, Feb. 2019 (Year: 2019).*

* cited by examiner

*Primary Examiner* — James M Hannett
(74) *Attorney, Agent, or Firm* — Young Basile Hanlon & MacFarlane, P.C.

(57) ABSTRACT

An image capture device may include a microphone, a vibration sensor, and a processor. The microphone may obtain a microphone signal that includes an acoustic signal portion and a mechanical noise portion. The vibration sensor may obtain a vibration signal. The processor may upsample the vibration signal. The processor may determine a correlation value. The correlation value may be based on the microphone signal, the upsampled vibration signal, or both. The processor may determine filter coefficients. The filter coefficients may be determined on a condition that the correlation value is above a threshold. The filter coefficient may be based on the upsampled vibration signal. The processor may filter the vibration signal based on the filter coefficients to remove the mechanical noise portion and obtain a processed microphone signal. The processor may output the processed microphone signal.

20 Claims, 13 Drawing Sheets

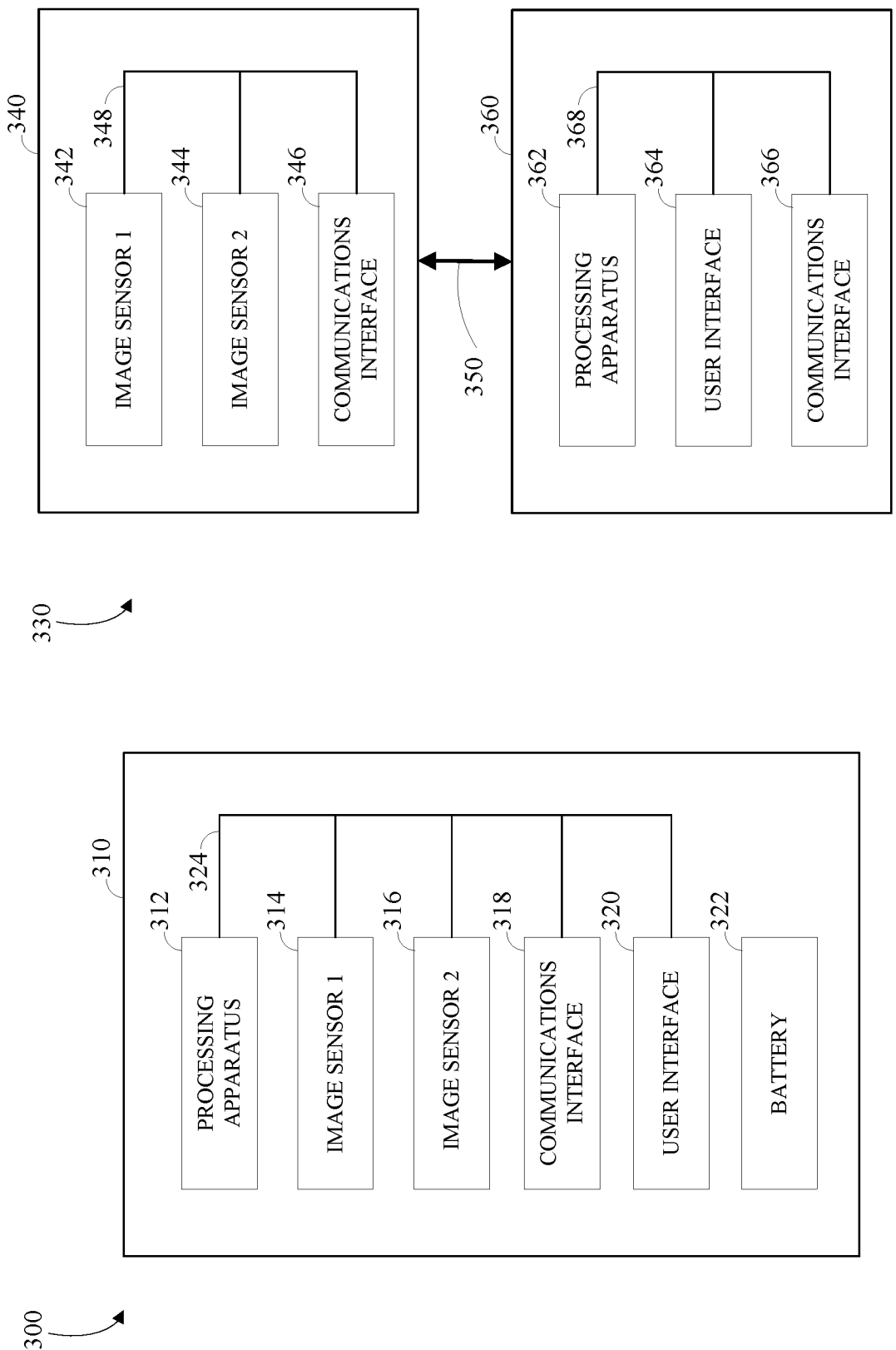

METHOD AND APPARATUS FOR ACTIVE REDUCTION OF MECHANICALLY COUPLED VIBRATION IN MICROPHONE SIGNALS

TECHNICAL FIELD

This disclosure relates to noise reduction for electronic devices.

BACKGROUND

Microphones in electronic devices are prone to detect unwanted structural vibration noise in addition to detecting desirable acoustic vibrations. Typical solutions to reduce unwanted structural vibration noise include the use of mechanical isolation devices such as dampeners. Mechanical isolation devices can add to the weight of the electronic devices. In addition, mechanical isolation devices can limit the design of the electronic devices due to size constraints. It would be desirable to have a method and apparatus to reduce unwanted structural vibration noise in microphone signals using sensor data.

SUMMARY

Disclosed herein are implementations of a method and apparatus for active reduction of mechanically coupled vibration in electronic devices. In an aspect, an image capture device may include a microphone, a vibration sensor, and a processor. The microphone may be configured to obtain a microphone signal. The microphone signal may include an acoustic signal portion and a mechanical noise portion. The vibration sensor may be configured to obtain a vibration signal. The processor may be configured to receive the microphone signal, the vibration signal, or both. The processor may be configured to upsample the vibration signal. The processor may be configured to determine a correlation value. The correlation value may be based on the microphone signal, the upsampled vibration signal, or both. The processor may be configured to determine filter coefficients. The filter coefficients may be referred to as a set of filter coefficients. The filter coefficients may be determined on a condition that the correlation value is above a threshold. The filter coefficient may be based on the upsampled vibration signal. The processor may be configured to filter the vibration signal based on the filter coefficients to remove the mechanical noise portion of the microphone signal and obtain a processed microphone signal. The processor may be configured to output the processed microphone signal.

In another aspect, an image capture device may include a microphone, a vibration sensor, and a processor. The microphone may be configured to obtain a microphone signal at a first sampling rate. The microphone signal may include an acoustic signal portion and a mechanical noise portion. The vibration sensor may be configured to obtain a vibration signal at a second sampling rate. The second sampling rate may be less than the first sampling rate. The processor may be configured upsample the vibration signal. The processor may be configured to determine a correlation value. The correlation value may be based on the microphone signal, the upsampled vibration signal, or both. The processor may be configured to filter the vibration signal based on the filter coefficients to remove the mechanical noise portion of the microphone signal and obtain a processed microphone signal. The processor may be configured to output the processed microphone signal.

In another aspect, a method may be implemented in an electronic device to reduce unwanted structural vibration noise in microphone signals. The method may include obtaining a microphone signal. The microphone signal may include an acoustic signal portion, a mechanical noise portion, or both. The method may include obtaining a vibration signal. The method may include upsampling the vibration signal. The method may include determining a correlation value. The correlation value may be based on the microphone signal, the upsampled vibration signal, or both. The method may include determining filter coefficients. The filter coefficients may be based on the upsampled vibration signal. The method may include filtering the vibration signal based on the filter coefficients to remove the mechanical noise portion of the microphone signal and obtain a processed microphone signal. The method may include outputting the processed microphone signal.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
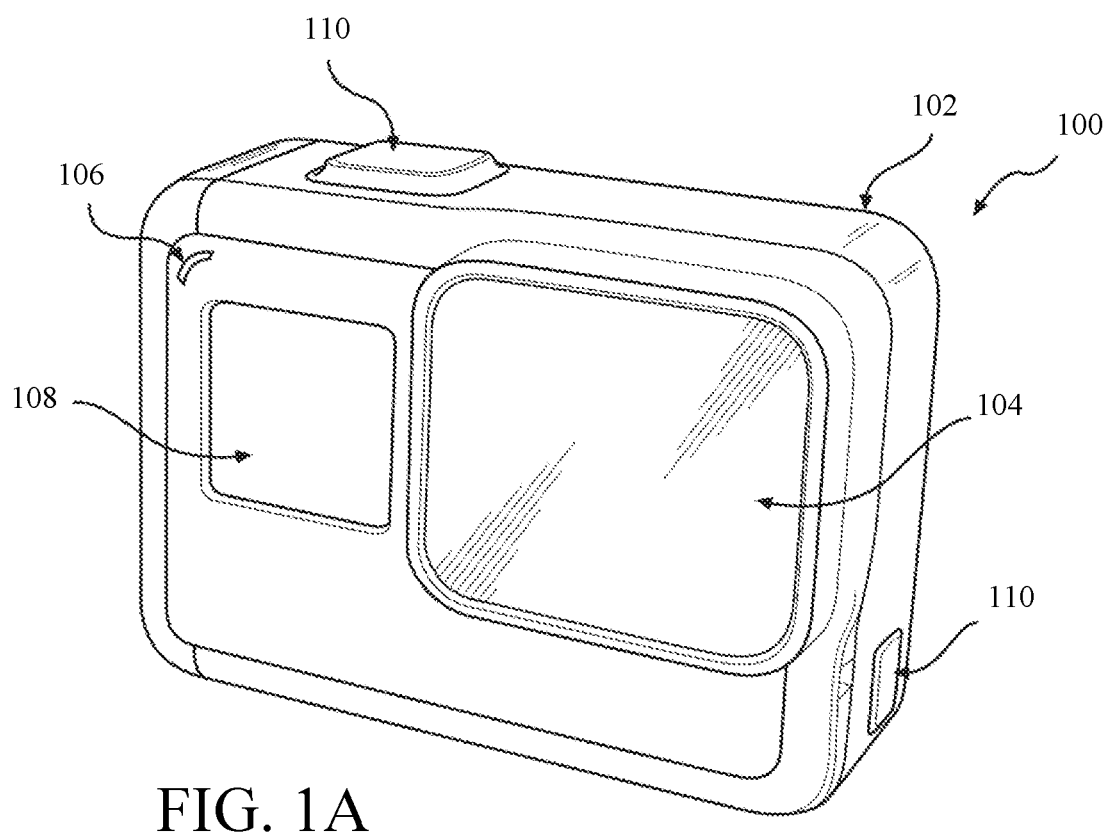
FIGS. 1A-D are isometric views of an example of an image capture device.

In the implementations described herein, the level of unwanted structural vibration noise may be reduced in the captured microphone signal using data from a vibration sensor. The vibration sensor may be used in conjunction with a microelectromechanical system (MEMS) microphone, an active noise cancellation system, or both. The vibration sensor may be configured to detect mechanical vibration without detecting acoustic vibration. The detected mechanical vibration may be used as an error signal in an adaptive filter.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video. The image capture device 100 may also include a drain microphone 112A configured to receive and record audio signals in conjunction with recording video.

Figure 1B:
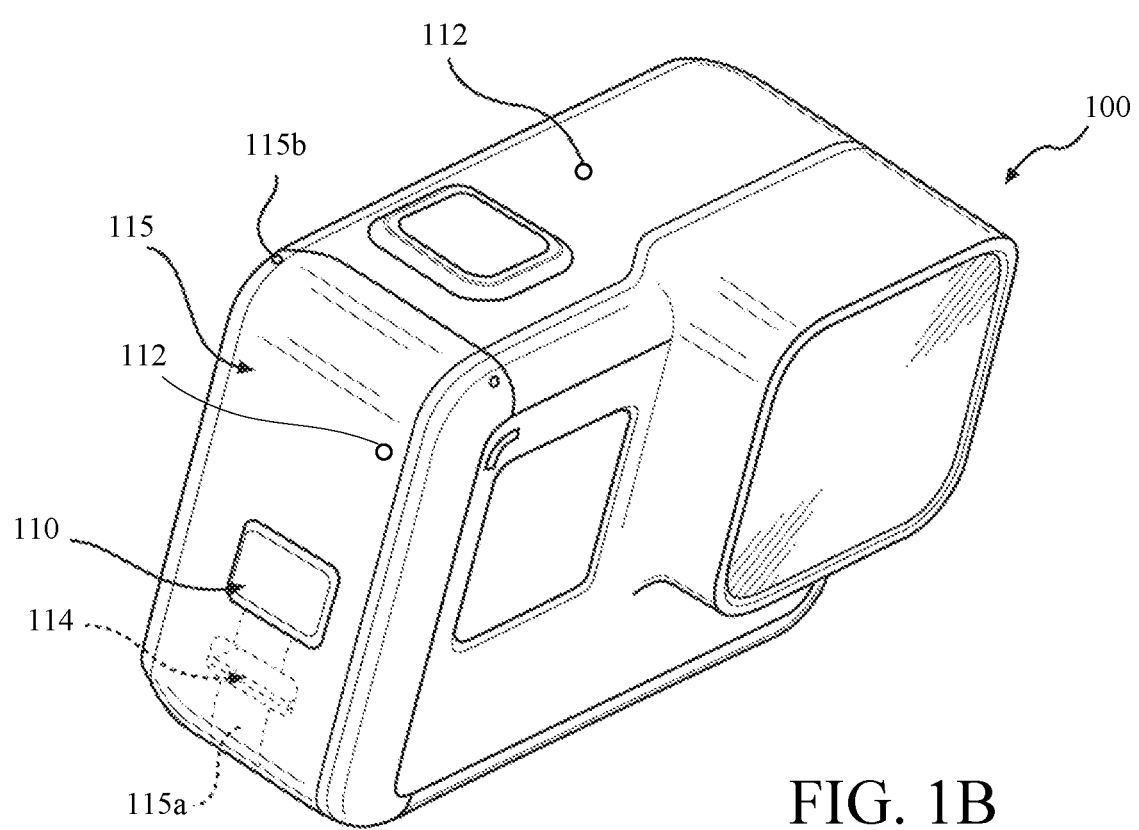
Figure 1C:
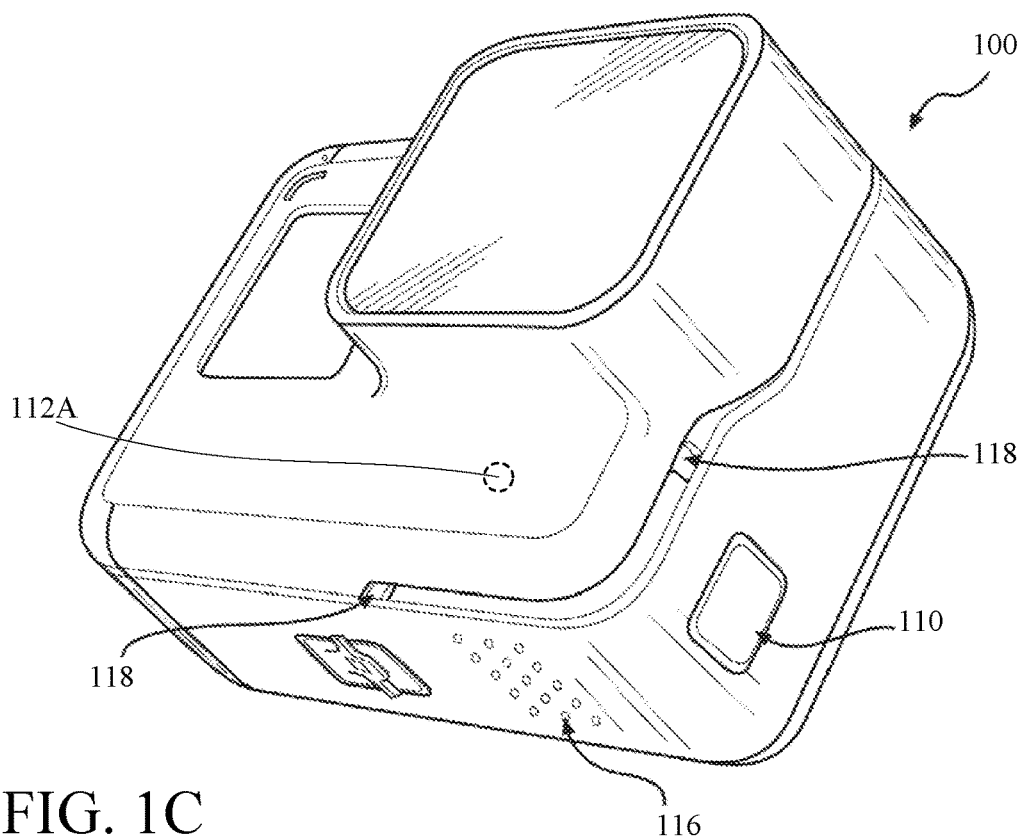
Figure 1D:
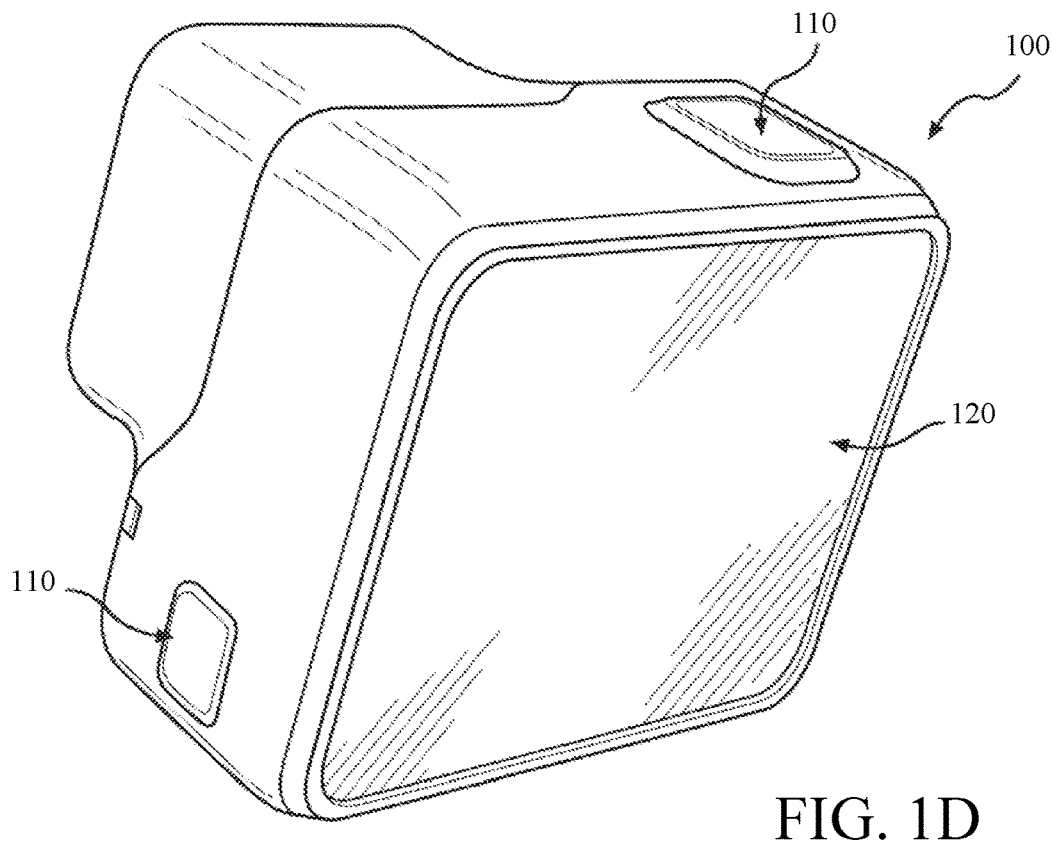

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include a speaker 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
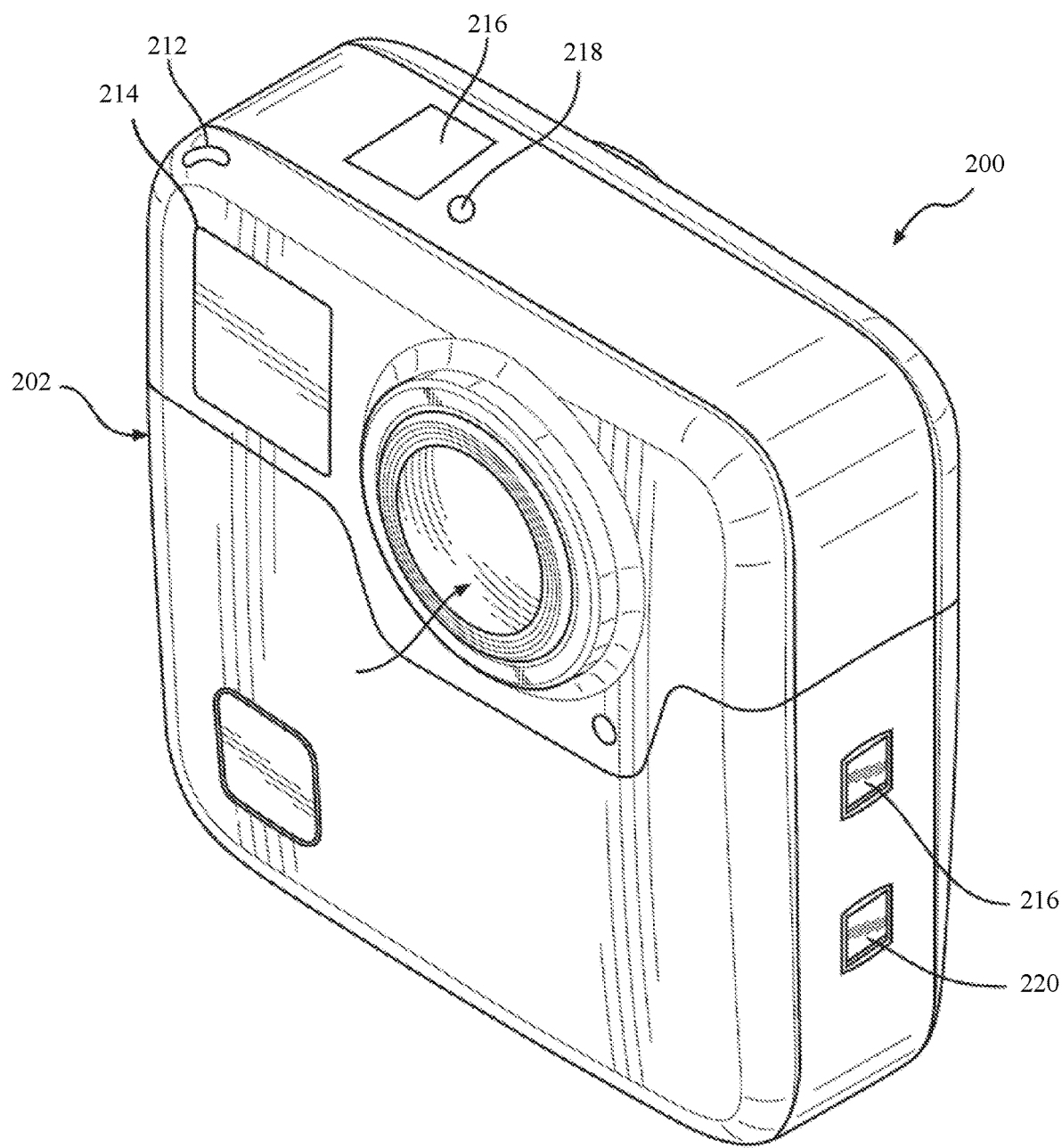
FIGS. 2A-B are isometric views of another example of an image capture device.
Figure 2B:
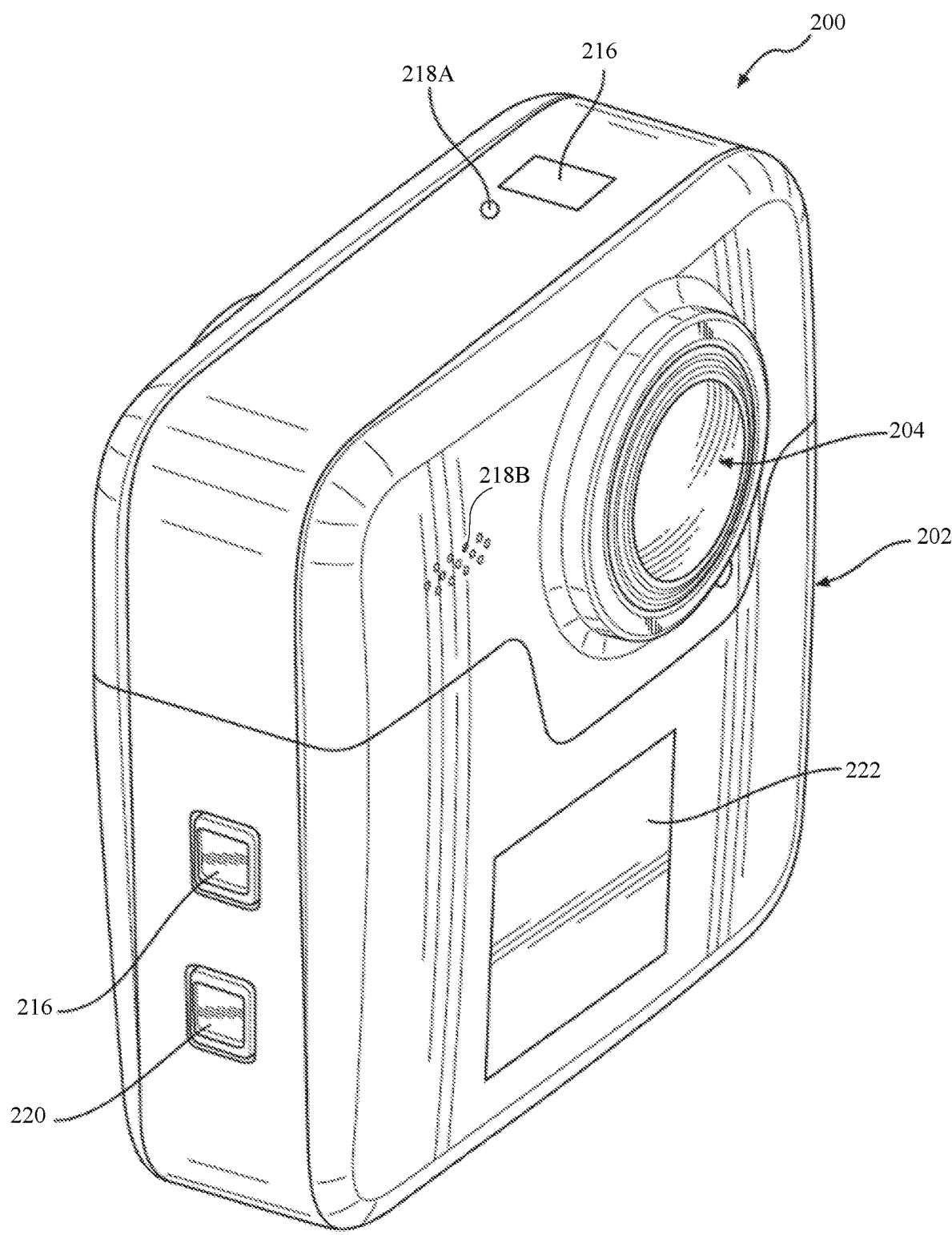

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218A and 218B configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
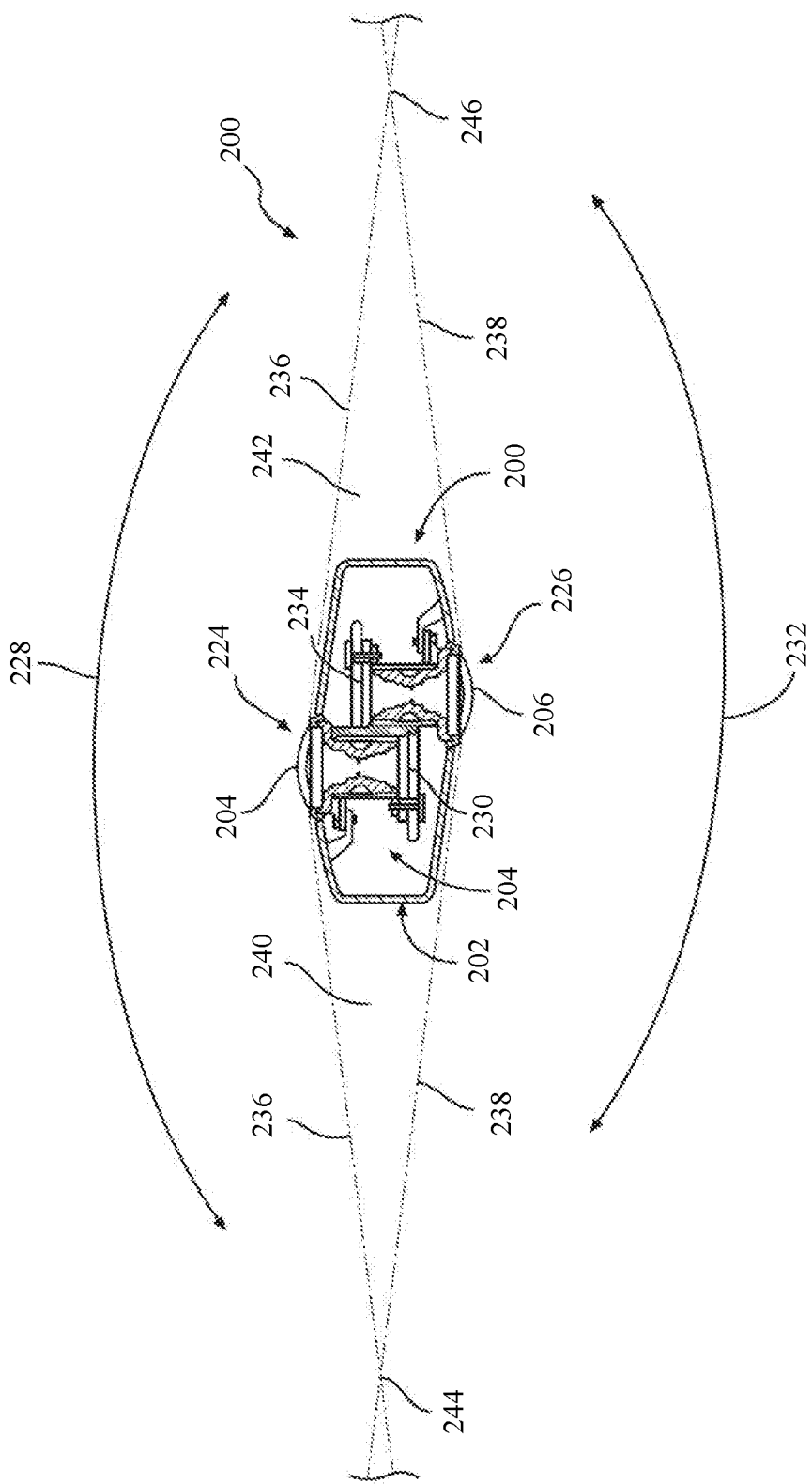
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3 DNR). In some implementations, pixels along the stitch boundary may be matched accurately to minimize boundary discontinuities.

FIGS. 3A-B are block diagrams of examples of image capture systems. Referring first to FIG. 3A, an image capture system 300 is shown. The image capture system 300 includes an image capture device 310 (e.g., a camera or a drone), which may, for example, be the image capture device 100 shown in FIGS. 1A-D or the image capture device 200 shown in FIGS. 2A-B.

The image capture device 310 includes a processing apparatus 312 that is configured to receive a first image from the first image sensor 314 and receive a second image from the second image sensor 316. The processing apparatus 312 may be configured to perform image signal processing (e.g., filtering, tone mapping, stitching, and/or encoding) to generate output images based on image data from the image sensor 314, image sensor 316, or both. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312. For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 8:
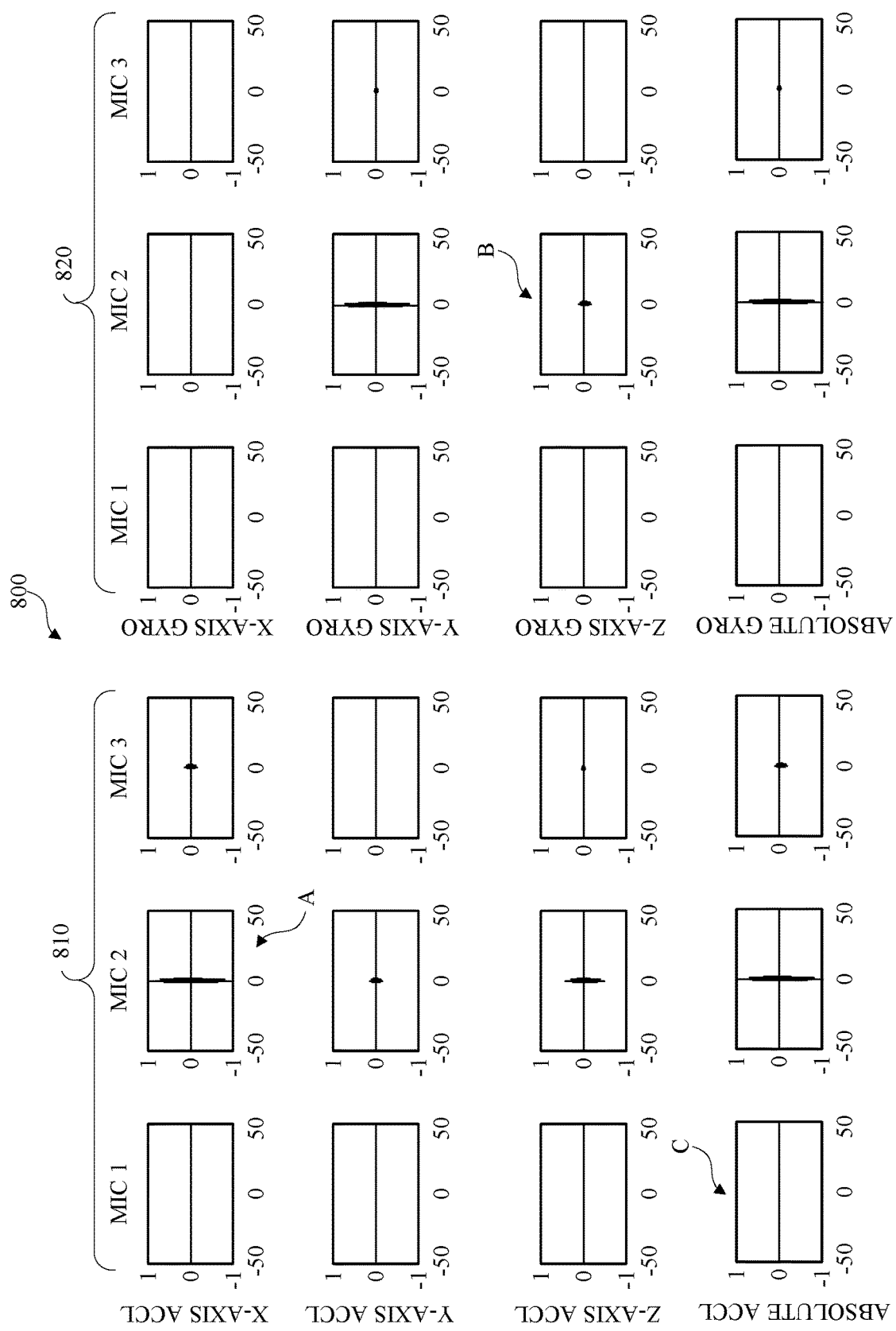
FIG. 8 is a diagram of example plots of correlation values of microphone and IMU signals.

The image capture system 300 may implement some or all of the techniques described in this disclosure, such as the method 800 described in FIG. 8.

Referring next to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D or the image capture device 200 shown in FIGS. 2A-C. The personal computing device 360 may, for example, be the user interface device described with respect to FIGS. 1A-D.

The image capture device 340 includes a first image sensor 342 and a second image sensor 344 that are configured to capture respective images. The image capture device 340 includes a communications interface 346 configured to transfer images via the communication link 350 to the personal computing device 360.

The personal computing device 360 includes a processing apparatus 362 that is configured to receive, using the communications interface 366, a first image from the first image sensor 342 and a second image from the second image sensor 344. The processing apparatus 362 may be configured to perform image signal processing (e.g., filtering, tone mapping, stitching, and/or encoding) to generate output images based on image data from the image sensors 342, 344.

The first image sensor 342 and the second image sensor 344 are configured to detect light of a certain spectrum (e.g., the visible spectrum or the infrared spectrum) and convey information constituting an image as electrical signals (e.g., analog or digital signals). For example, the image sensors 342 and 344 may include CCDs or active pixel sensors in a CMOS. The image sensors 342 and 344 may detect light incident through a respective lens (e.g., a fisheye lens). In some implementations, the image sensors 342 and 344 include digital-to-analog converters. In some implementations, the image sensors 342 and 344 are held in a fixed relative orientation with respective fields of view that overlap. Image signals from the image sensors 342 and 344 may be passed to other components of the image capture device 340 via a bus 348.

The communications link 350 may be a wired communications link or a wireless communications link. The communications interface 346 and the communications interface 366 may enable communications over the communications link 350. For example, the communications interface 346 and the communications interface 366 may include an HDMI port or other interface, a USB port or other interface, a FireWire interface, a Bluetooth interface, a ZigBee interface, and/or a Wi-Fi interface. For example, the communications interface 346 and the communications interface 366 may be used to transfer image data from the image capture device 340 to the personal computing device 360 for image signal processing (e.g., filtering, tone mapping, stitching, and/or encoding) to generate output images based on image data from the image sensors 342 and 344.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or snap photograph) received via the user interface 364 may be passed on to the image capture device 340 via the communications link 350.

The image capture device 340 and/or the personal computing device 360 may be used to implement some or all of the techniques described in this disclosure, such as the method 800 of FIG. 8.

Figure 4A:
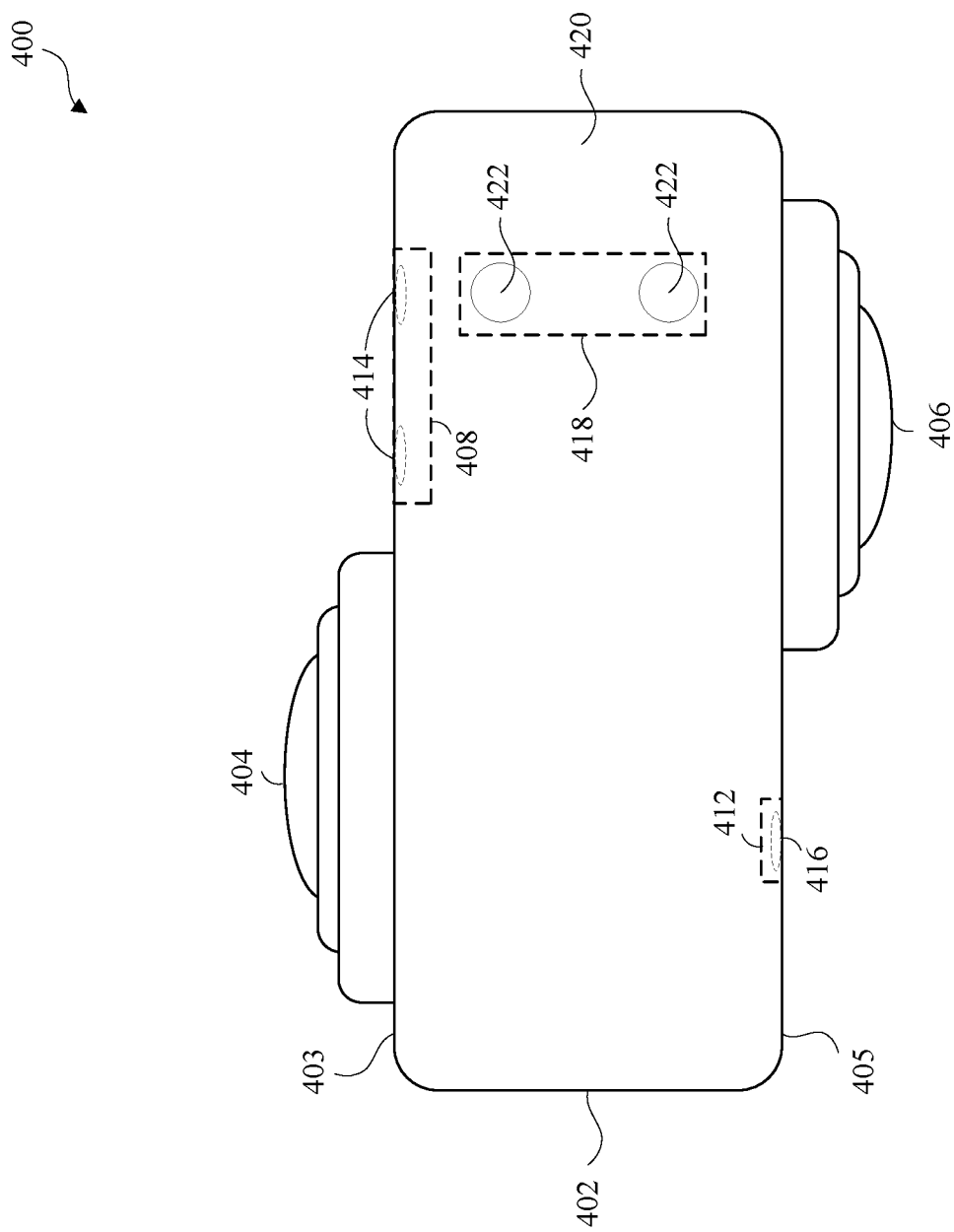
FIG. 4A is a diagram of a top-view of an image capture device in accordance with embodiments of this disclosure.

FIG. 4A is a diagram of a top-view of an image capture device 400 in accordance with embodiments of this disclosure. The image capture device 400 comprises a camera body 402 having two camera lenses 404, 406 structured on front and back surfaces 403, 405 of the camera body 402. The two lenses 404, 406 are oriented in opposite directions and couple with two images sensors mounted on circuit boards (not shown). Other electrical camera components (e.g., an image processor, camera SoC (system-on-chip), etc.) may also be included on one or more circuit boards within the camera body 402 of the image capture device 400.

The lenses 404, 406 may be laterally offset from each other, may be off-center from a central axis of the image capture device 400, or may be laterally offset and off-center from the central axis. As compared to an image capture device with back-to-back lenses, such as lenses aligned along the same axis, the image capture device 400 including laterally offset lenses 404, 406 may include substantially reduced thickness relative to the lengths of the lens barrels securing the lenses 404, 406. For example, the overall thickness of the image capture device 400 may be close to the length of a single lens barrel as opposed to twice the length of a single lens barrel as in a back-to-back configuration.

The image capture device 400 includes a microphone array that comprises a front-facing component 408, a rear-facing component 412, and a side-facing component 418. The front-facing component 408, the rear-facing component 412, and the side-facing component 418 may each be referred to as a microphone assembly. The side-facing component 418 may be on any side of the image capture device 400 that is perpendicular to the front-facing component 408 and the rear-facing component 412, and may include a top surface, a bottom surface, a left surface, a right surface, or any combination thereof. As shown in FIG. 4A, the front-facing component 408 is disposed on the front surface 403 of the image capture device. The front-facing component 408 may include one or more microphone elements 414. The microphone elements 414 may be configured such that they are distanced approximately 6 mm to 18 mm apart. The rear-facing component 412 is disposed on the back surface 405 of the image capture device 400. The rear-facing component 412 may include one or more microphone elements 416. One or more of the microphone elements 416 may be configured as a drain microphone. The side-facing component 418 is shown on a top surface 420 of the image capture device 400 in this example. The side-facing component 418 may include one or more microphone elements 422. The microphone elements 422 may be configured such that they are distanced approximately 6 mm to 18 mm apart. The 6 mm to 18 mm spacing may determine the frequency resolution of the output. For example, the larger the spacing, the lower the highest resolvable frequency. The spacing may be adjusted depending on the resolution required.

Figure 5:
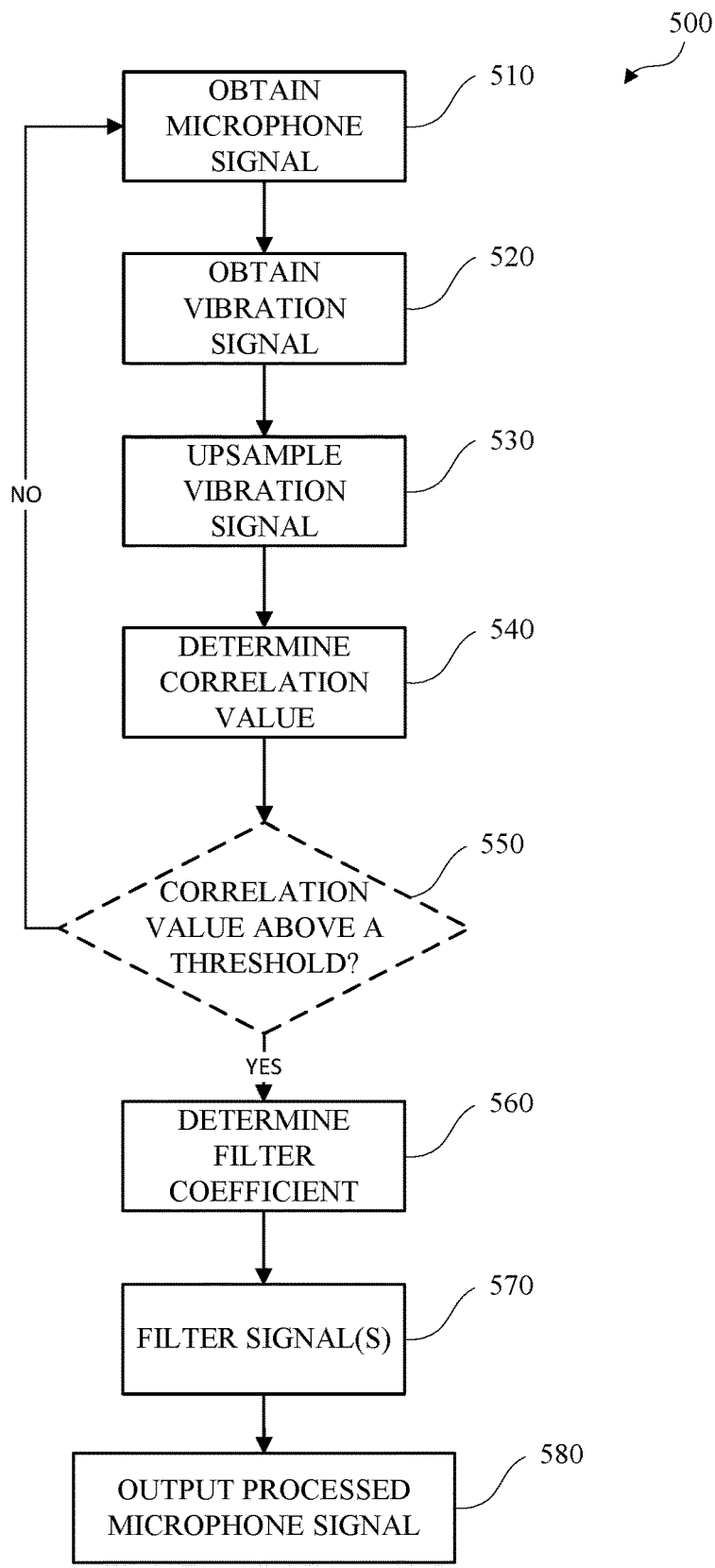
FIG. 5 is a flow diagram of an example of a method for reducing vibration noise.

The front-facing component 408, microphone elements 414, rear-facing component 412, and microphone elements 416 are shown in broken lines as they may not be visible in this view. The front-facing component 408, rear-facing component 412, and side-facing component 418 of the microphone array may represent microphone elements on an X, Y, Z axis to create X, Y, Z components of a First Order Ambisonics B-Format, as shown in FIG. 5. These microphone elements may be oriented on a sphere or off-axis, and may be transformed to the First Order Ambisonics B-Format.

Figure 4B:
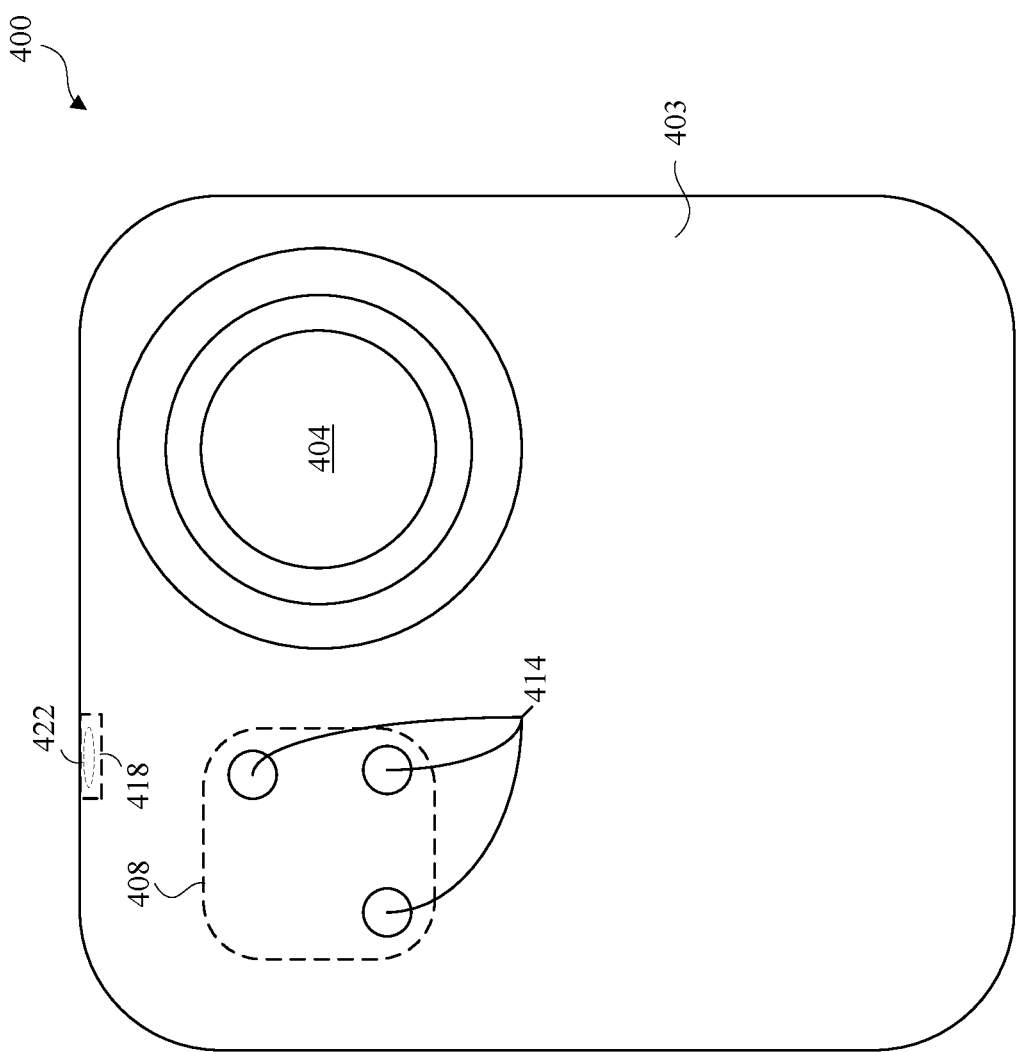
FIG. 4B is a diagram of a front-view of the image capture device shown in FIG. 4A in accordance with embodiments of this disclosure.

FIG. 4B is a diagram of a front-view of the image capture device 400 shown in FIG. 4A in accordance with embodiments of this disclosure. As shown in FIG. 4B, the front surface 403 of the image capture device 400 comprises the camera lens 404 and the front-facing component 408. Although the front-facing component 408 may include any number of microphone elements, the example shown in FIG. 4B includes three microphone elements 414. Each of the microphone elements 414 may be configured such that they are distanced approximately 6 mm to 18 mm apart. The side-facing component 418 and the microphone elements 422 are shown in broken lines as they may not be visible in this view.

Figure 4C:
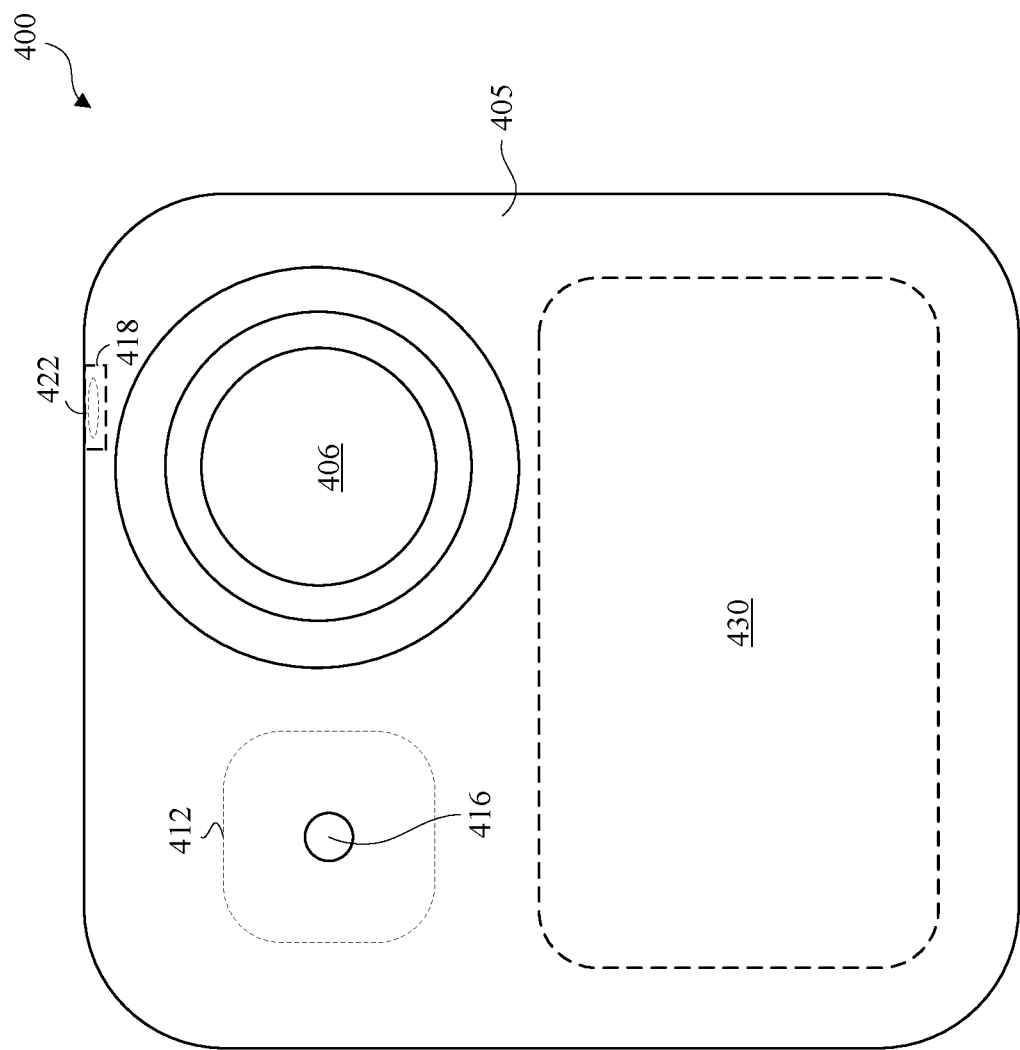
FIG. 4C is a diagram of a rear-view of the image capture device shown in FIG. 4A in accordance with embodiments of this disclosure.

FIG. 4C is a diagram of a rear-view of the image capture device 400 shown in FIG. 4A in accordance with embodiments of this disclosure. As shown in FIG. 4C, the back surface 405 of the image capture device 400 comprises the camera lens 406 and the rear-facing component 412. In an example, the back surface 405 of the image capture device 400 may include an interactive display 430 that allows for interaction with the image capture device 400 while simultaneously displaying information on a surface of the image capture device 400. Although the rear-facing component 412 may include any number of microphone elements, the example shown in FIG. 4C includes one microphone element 416. In an example, one or more of the microphone elements 416 may be configured as a drain microphone. The side-facing component 418 and the microphone elements 422 are shown in broken lines as they may not be visible in this view.

FIG. 5 is a flow diagram of an example of a method 500 for reducing vibration noise. The method 500 may be implemented by an image capture device, for example image capture device 100 shown in FIGS. 1A-1D, image capture device 400 shown in FIGS. 4A-4C, or both. As shown in FIG. 5, the method 500 includes obtaining 510 a microphone signal. The microphone signal may include an acoustic signal portion, a mechanical noise portion, or both. The mechanical noise portion may include unwanted or undesired noise introduced into the microphone signal caused by structural vibrations that are detected by one or more microphones via the image capture device body.

The method 500 includes obtaining 520 a vibration signal. The vibration signal may be obtained using any vibration sensor such as a piezoelectric vibration sensor or an inertial measurement unit (IMU). Although any vibration sensor may be used, the examples described herein refer to the vibration sensor as an IMU for simplicity. The IMU may include one or more components such as an accelerometer, a gyroscope, a magnetometer, or any combination thereof. Each component of the IMU may detect structural vibration and generate one or more vibration signals. The one or more vibration signals may include respective signals associated with an X-axis, Y-axis, Z-axis, or any combination thereof, for each component of the IMU.

Typical sampling rates for vibration sensors are insufficient for noise detection in the audible bandwidth. For example, a typical sampling rate for an accelerometer is 200 Hz. In the embodiments disclosed herein, the sampling rates for the vibration sensors are set to overlap with the human audible spectrum of about 20 Hz to about 20 kHz. For example, an accelerometer sampling rate may be set to about 1.6 kHz and a gyroscope sampling rate may be set to about 6.4 kHz.

As shown in FIG. 5, the method 500 includes upsampling 530 the vibration signal. Since the vibration signal is obtained as a lower sampling rate than the microphone signal, the vibration signal is upsampled 530 to match the sampling rate of the microphone signal.

The method 500 includes determining 540 a correlation value. The correlation value may be based on the microphone signal and the upsampled vibration signal. A correlation value may be determined between each microphone and each axis of each component of the IMU. For example, a device that includes three microphones, an accelerometer, and a gyroscope, 18 correlation values may be determined. The correlation values may range from 0 to 1, where a value of 0 would indicate no correlation between a microphone signal and a respective vibration signal, and a value of 1 would indicate a high correlation between the microphone signal and the respective vibration signal. An example of the correlation between microphone signals and vibration signals is shown in FIG. 8.

Referring again to FIG. 5, in some examples, the method 500 may include determining 550 whether a correlation value is above a threshold. In some examples, the threshold for the correlation value may be 0.5. If the correlation value is determined to be above the threshold, the method includes determining 560 one or more filter coefficients. The filter coefficients may be based on the upsampled vibration signal.

The method 500 includes filtering 570 the upsampled vibration signal based on the filter coefficients to remove the mechanical noise portion of the microphone signal to obtain a processed microphone signal. In some examples, the filter coefficient may be applied to the most correlated axis per microphone. For example, if a microphone signal has a correlation value of 1 associated with an X-axis accelerometer signal, a correlation value of 0.1 associated with a Y-axis accelerometer signal, and a correlation value of 0.4 associated with a Z-axis accelerometer signal, the filter coefficient may be applied to the microphone signal associated with the X-axis accelerometer signal. In some examples, the vibration signal may be a composite signal including the X-axis, Y-axis, and Z-axis components associated with the vibration signal.

The method 500 includes outputting 580 the processed microphone signal. Outputting 580 the processed microphone signal may include transmitting the processed microphone signal. Outputting 580 the processed microphone signal may include storing the microphone signal, for example in a memory such as processing apparatus 312 of FIG. 3A.

Figure 6:
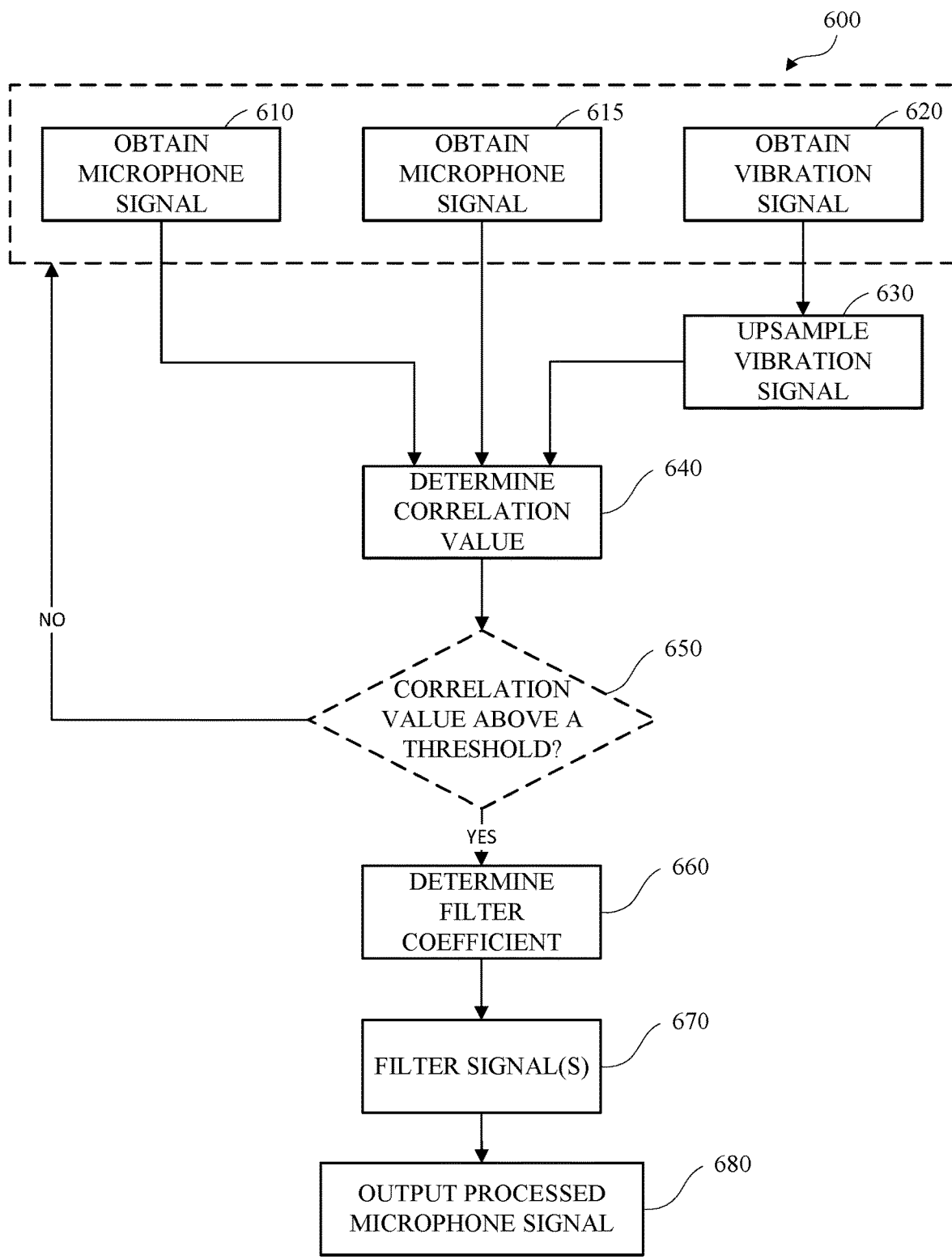
FIG. 6 is a flow diagram of another example of a method for reducing vibration noise.

FIG. 6 is a flow diagram of another example of a method 600 for reducing vibration noise in microphone signals. The method 600 may be implemented by an image capture device, for example image capture device 100 shown in FIGS. 1A-1D, image capture device 400 shown in FIGS. 4A-4C, or both. As shown in FIG. 6, the method 600 includes obtaining 610 a first microphone signal and obtaining 615 a second microphone signal. The microphone signals may each include an acoustic signal portion, a mechanical noise portion, or both. The mechanical noise portion may include unwanted or undesired noise introduced into the microphone signal caused by structural vibrations that are detected by one or more microphones via the image capture device body.

The method 600 includes obtaining 620 a vibration signal. The vibration signal may be obtained using any vibration sensor such as a piezoelectric vibration sensor or an IMU. Although any vibration sensor may be used, the examples described herein refer to the vibration sensor as an IMU for simplicity. The IMU may include one or more components such as an accelerometer, a gyroscope, a magnetometer, or any combination thereof. Each component of the IMU may detect structural vibration and generate one or more vibration signals. The one or more vibration signals may include respective signals associated with an X-axis, Y-axis, Z-axis, or any combination thereof, for each component of the IMU.

Typical sampling rates for vibration sensors are insufficient for noise detection in the audible bandwidth. For example, a typical sampling rate for an accelerometer is 200 Hz. In the embodiments disclosed herein, the sampling rates for the vibration sensors are set to overlap with the human audible spectrum of about 20 Hz to about 20 kHz. For example, an accelerometer sampling rate may be set to about 1.6 kHz and a gyroscope sampling rate may be set to about 6.4 kHz.

As shown in FIG. 6, the method 600 includes upsampling 630 the vibration signal. Since the vibration signal is obtained as a lower sampling rate than the microphone signals, the vibration signal is upsampled 630 to match the sampling rate of the microphone signals.

The method 600 includes determining 640 a correlation value. The correlation value may be based on the first microphone signal, the second microphone signal, and the upsampled vibration signal. A correlation value may be determined between each microphone and each axis of each component of the IMU. For example, a device that includes three microphones, an accelerometer, and a gyroscope, 18 correlation values may be determined. The correlation values may range from 0 to 1, where a value of 0 would indicate no correlation between a microphone signal and a respective vibration signal, and a value of 1 would indicate a high correlation between the microphone signal and the respective vibration signal. An example of the correlation between microphone signals and vibration signals is shown in FIG. 8.

Referring again to FIG. 6, in some examples, the method 600 may include determining 650 whether a correlation value is above a threshold. In some examples, the threshold for the correlation value may be 0.5. If the correlation value is determined to be above the threshold, the method includes determining 660 one or more filter coefficients. The filter coefficients may be based on the upsampled vibration signal.

The method 600 includes filtering 670 the upsampled vibration signal based on the filter coefficients to remove the mechanical noise portion of the microphone signal to obtain one or more processed microphone signals. In some examples, the filter coefficient may be applied to the most correlated axis per microphone. For example, if a microphone signal has a correlation value of 1 associated with an X-axis accelerometer signal, a correlation value of 0.1 associated with a Y-axis accelerometer signal, and a correlation value of 0.4 associated with a Z-axis accelerometer signal, the filter coefficient may be applied to the microphone signal associated with the X-axis accelerometer signal.

The method 600 includes outputting 680 the processed microphone signals. Outputting 680 the processed microphone signals may include transmitting the processed microphone signals. Outputting 680 the processed microphone signals may include storing the microphone signals, for example in a memory such as processing apparatus 312 of FIG. 3A.

Figure 7:
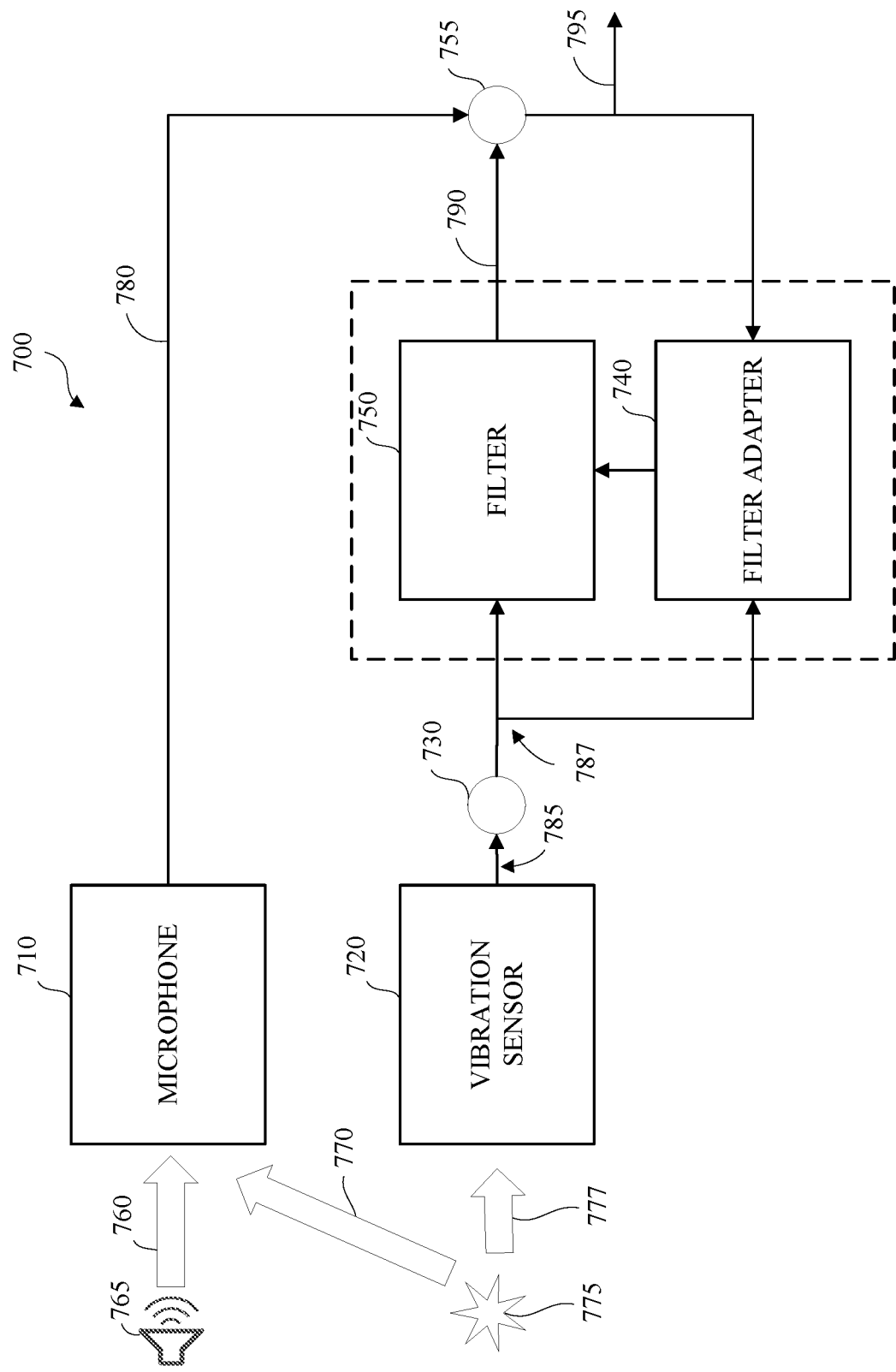
FIG. 7 is a block diagram of an example of an integrated circuit for reducing vibration noise.

FIG. 7 is a block diagram of an example of an integrated circuit 700 for reducing vibration noise. The integrated circuit 700 may be implemented in an image capture device, for example image capture device 100 shown in FIGS. 1A-1D, image capture device 400 shown in FIGS. 4A-4C, or both. As shown in FIG. 7, the integrated circuit 700 includes a microphone 710, a vibration sensor 720, an upsampler 730, a filter adapter 740, a filter 750, and a summing unit 755. The summing unit 755 may be configured to perform an addition operation, a subtraction operation, or both. The integrated circuit 700 is shown with one microphone and one vibration sensor for simplicity and clarity, and it is understood that some implementations may include multiple microphones, multiple vibration sensors, or both. In some implementations, the microphone 710, the vibration sensor 720, or both may be separate from the integrated circuit 700.

As shown in FIG. 7, the microphone 710 is configured to receive a desired acoustical input 760 from an acoustic source 765 and undesired mechanical noise 770. The undesired mechanical noise 770 may be caused by a vibration 775. The undesired mechanical noise 770 may be caused by a structural vibration 775 that may be detected by the microphone 710 via the image capture device body. The undesired mechanical noise 770 may introduce noise into the microphone signal 780.

The vibration sensor 720 is configured to detect the structural vibration 775. The vibration sensor 720 is configured to receive a vibration input 777 caused by the structural vibration 775. The vibration sensor may include a piezoelectric vibration sensor or an IMU. The IMU may include one or more components such as an accelerometer, a gyroscope, a magnetometer, or any combination thereof. Each component of the IMU may detect structural vibration and generate one or more vibration signals. The one or more vibration signals may include respective signals associated with an X-axis, Y-axis, Z-axis, or any combination thereof, for each component of the IMU.

The upsampler 730 is configured to receive the vibration signal 785 from the vibration sensor 720. The upsampler 730 is configured to upsample the vibration signal 785. Since the vibration signal 785 may be obtained at a lower sampling rate than the microphone signal 780, the upsampler 730 is configured to upsample the vibration signal 785 to match the sampling rate of the microphone signal 780 and output an upsampled vibration signal 787.

The filter adapter 740 is configured to receive the microphone signal 780 and the upsampled vibration signal 787. The filter adapter is configured to apply an adaptive algorithm to the microphone signal 780 and the upsampled vibration signal 787 to minimize the difference between the two signals. An example adaptive algorithm may include a normalized least mean square algorithm. The normalized least mean square algorithm may be configured to mimic a desired filter by determining the filter coefficients that relate to producing the least mean square of an error signal. The error signal in this example is the difference between the desired signal and the actual signal. The output of the filter adapter 740 is used to update the filter 750. The filter coefficients of filter 750 may be adjusted based on the least mean square result of the upsampled vibration signal and the microphone signal.

The filter 750 is configured to receive the upsampled vibration signal 787. The filter 750 is configured to filter the upsampled vibration signal 787 to obtain the filtered vibration signal 790. The summing unit 755 is configured to remove the filtered vibration signal 790 from the microphone signal 780 using a subtraction operation and output the error signal 795. The error signal 795 may be input to the filter adapter 740 to form a feedback loop to continuously update the filter 750. In this example, the error signal 795 is the desired signal, i.e. the microphone signal without vibration noise.

FIG. 8 is a diagram of example plots of correlation values 800 of microphone and IMU signals. In this example, accelerometer-microphone cross-correlation plots 810 and gyroscope-microphone cross-correlation plots 820 for a device configured with three microphones (MIC1, MIC2, MIC 3) are shown. The accelerometer-microphone cross-correlation plots 810 show the correlation between the signals of each of MIC 1, MIC 2, and MIC 3 and the accelerometer signals for each of X-axis, Y-axis, and Z-axis of the accelerometer. The accelerometer-microphone cross-correlation plots 810 also show the sum of the signals of each accelerometer axis for each microphone. The gyroscope-microphone cross-correlation plots 820 show the correlation between the signals of each of MIC 1, MIC 2, and MIC 3 and the gyroscope signals for each of X-axis, Y-axis, and Z-axis of the gyroscope. The gyroscope-microphone cross-correlation plots 820 also show the sum of the signals of each gyroscope axis for each microphone.

As shown in FIG. 8, the correlation values may range from −1 to 1, where a value of 0 indicates no correlation between a microphone signal and a respective vibration signal, a value of 1 indicates a perfect correlation between the microphone signal and the respective vibration signal, and a value of −1 indicates an inverse correlation or negative correlation between the microphone signal and the respective vibration signal. As shown in FIG. 8, graph A is a representation of the cross-correlation between the MIC 2 signal and the X-axis accelerometer signal. In graph A, the microphone signal of MIC 2 is shown to have a correlation value of 1 associated with an X-axis accelerometer signal. Graph B is a representation of the cross-correlation between the MIC 2 signal and the Z-axis gyroscope signal. In graph B, the microphone signal of MIC 2 has a correlation value of about 0.1 associated with a Z-axis gyroscope signal. As shown in FIG. 8, the cross-correlations for each microphone signal stream may be summed to obtain a composite microphone signal. For example, graph C is a representation of the summed microphone signal stream for MIC 1 that includes the X-axis, Y-axis, and Z-axis components associated with the accelerometer signal.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
a microphone configured to obtain a microphone signal that includes an acoustic signal portion and a mechanical noise portion;
a vibration sensor configured to obtain a vibration signal; and
a processor configured to:
receive the microphone signal and the vibration signal;
upsample the vibration signal to obtain an upsampled vibration signal, wherein the upsampled vibration signal has one or more axial components;
determine correlation values for the one or more axial components, wherein a respective axial component has a corresponding correlation value based on the microphone signal and the upsampled vibration signal;
on a condition that a correlation value from the correlation values is above a threshold, determine filter coefficients based on the upsampled vibration signal;
filter the axial component corresponding to a determined highest correlation value from amongst the correlation values of the upsampled vibration signal based on the filter coefficients to remove the mechanical noise portion and obtain a processed microphone signal; and
output the processed microphone signal.

2. The image capture device of claim 1, wherein the vibration sensor is an inertial measurement unit (IMU) that includes an accelerometer, a gyroscope, or both.

3. The image capture device of claim 2, wherein a sampling rate of the accelerometer is 1.6 kHz.

4. The image capture device of claim 2, wherein a sampling rate of the gyroscope is 6.4 kHz.

5. The image capture device of claim 2, wherein the one or more axial components includes an X-axis accelerometer component, a Y-axis accelerometer component, and a Z-axis accelerometer component.

6. The image capture device of claim 2, wherein the one or more axial components includes an X-axis gyroscope component, a Y-axis gyroscope component, and a Z-axis gyroscope component.

7. The image capture device of claim 1, wherein the processor is configured to upsample the vibration signal to match a sampling rate of the microphone signal.

8. The image capture device of claim 1, wherein the processor is configured to filter the axial component corresponding to the determined highest correlation value from amongst the correlation values of the upsampled vibration signal to obtain a filtered vibration signal and remove the filtered vibration signal from the microphone signal to obtain the processed microphone signal.

9. An image capture device comprising:
a microphone configured to obtain a microphone signal at a first sampling rate, wherein the microphone signal includes an acoustic signal portion and a mechanical noise portion;
a vibration sensor configured to obtain a vibration signal at a second sampling rate, wherein the second sampling rate is less than the first sampling rate; and
a processor configured to:
upsample the vibration signal to obtain an upsampled vibration signal, wherein the upsampled vibration signal has one or more axial components;
determine correlation values for the one or more axial components, wherein a respective axial component has a corresponding correlation value based on the microphone signal and the upsampled vibration signal;
filter the axial component corresponding to a determined highest correlation value from amongst the correlation values of the upsampled vibration signal based on filter coefficients to remove the mechanical noise portion and obtain a processed microphone signal; and
output the processed microphone signal.

10. The image capture device of claim 9, wherein the filter coefficients are based on the upsampled vibration signal.

11. The image capture device of claim 9, wherein the vibration sensor is an inertial measurement unit (IMU) that includes an accelerometer, a gyroscope, or both.

12. The image capture device of claim 11, wherein the one or more axial components includes an X-axis accelerometer component, a Y-axis accelerometer component, and a Z-axis accelerometer component.

13. The image capture device of claim 11, wherein the one or more axial components includes an X-axis gyroscope component, a Y-axis gyroscope component, and a Z-axis gyroscope component.

14. The image capture device of claim 9, wherein the processor is configured to upsample the vibration signal to match the second sampling rate with the first sampling rate.

15. A method for reducing structural noise in an image capture device, the method comprising:
  obtaining a microphone signal that includes an acoustic signal portion and a mechanical noise portion;
  obtaining a vibration signal; and
  upsampling the vibration signal to obtain an upsampled vibration signal, wherein the upsampled vibration signal has one or more axial components;
  determining correlation values for the one or more axial components, wherein a respective axial component has a corresponding correlation value based on the microphone signal and the upsampled vibration signal;
  determining filter coefficients based on the upsampled vibration signal;
  filtering the axial component corresponding to a determined highest correlation value from amongst the correlation values of the upsampled vibration signal based on the filter coefficient to remove the mechanical noise portion and obtain a processed microphone signal; and
  outputting the processed microphone signal.

16. The method of claim 15, wherein the vibration signal includes an accelerometer signal and a gyroscope signal.

17. The method of claim 16, wherein the one or more axial components includes an X-axis accelerometer component, a Y-axis accelerometer component, and a Z-axis accelerometer component.

18. The method of claim 16, wherein the one or more axial components includes an X-axis gyroscope component, a Y-axis gyroscope component, and a Z-axis gyroscope component.

19. The method of claim 15, wherein upsampling the vibration signal includes matching a sampling rate of the vibration signal to a sampling rate of the microphone signal.

20. The method of claim 15, wherein the filtering includes filtering the axial component corresponding to the determined highest correlation value from amongst the correlation values of the upsampled vibration signal to obtain a filtered vibration signal and removing the filtered vibration signal from the microphone signal to obtain the processed microphone signal.

* * * * *